US011859781B1

United States Patent

(12) United States Patent
Liu et al.
(10) Patent No.: US 11,859,781 B1
(45) Date of Patent: Jan. 2, 2024

(54) PORTABLE ILLUMINATION DEVICE

(71) Applicant: Analog Technologies, Inc., San Jose, CA (US)

(72) Inventors: Gang Liu, San Jose, CA (US); Lili Shi, San Jose, CA (US); Yuqi Zhang, San Jose, CA (US); Nan Shi, San Jose, CA (US)

(73) Assignee: Analog Technologies, Inc., San Jose, CA (US)

( * ) Notice: Subject to any disclaimer, the term of this patent is extended or adjusted under 35 U.S.C. 154(b) by 0 days.

(21) Appl. No.: 17/818,358

(22) Filed: Aug. 8, 2022

(51) Int. Cl.

| | |
|---|---|
| *F21L 4/04* | (2006.01) |
| *F21V 21/40* | (2006.01) |
| *F21L 4/08* | (2006.01) |
| *F21V 23/04* | (2006.01) |
| *F21Y 115/10* | (2016.01) |

(52) U.S. Cl.
CPC ................. *F21L 4/04* (2013.01); *F21L 4/085* (2013.01); *F21V 21/406* (2013.01); *F21V 23/0414* (2013.01); *F21Y 2115/10* (2016.08)

(58) Field of Classification Search
CPC ..... F21L 4/04; F21L 4/085; F21L 4/08; F21V 21/406; F21V 23/0414; F21Y 2115/10
See application file for complete search history.

(56) References Cited

U.S. PATENT DOCUMENTS

| | | | | |
|---|---|---|---|---|
| 5,239,451 A * | 8/1993 | Menke | F21L 4/085 | 362/208 |
| 5,570,948 A * | 11/1996 | Menke | H02J 7/0042 | 362/199 |
| 2003/0095403 A1* | 5/2003 | Tang | F21V 21/406 | 362/183 |
| 2009/0279290 A1* | 11/2009 | Henry | F21V 21/0885 | 362/396 |
| 2010/0238653 A1* | 9/2010 | Pelletier | F21V 21/406 | 362/191 |
| 2010/0284175 A1* | 11/2010 | Lau | F21L 4/005 | 362/362 |
| 2015/0192243 A1* | 7/2015 | Sharrah | F21L 4/00 | 362/190 |
| 2018/0356088 A1* | 12/2018 | Horne | A47G 23/0216 | |
| 2019/0017689 A1* | 1/2019 | Parsons | F21V 21/406 | |

FOREIGN PATENT DOCUMENTS

CN 109442247 A * 3/2019

* cited by examiner

*Primary Examiner* — Erin Kryukova
(74) *Attorney, Agent, or Firm* — Syncoda LLC; Feng Ma

(57) ABSTRACT

A portable illumination device includes a first component having a light source(s) and a second component coupled to the first component, and the second component includes a curved handle containing one or more battery cells within the curved handle, wherein the light source(s) are powered via the one or more battery cells, and wherein a center of mass of the illumination device is located in the curved handle. By way of example, the brightnesses of the light source(s) are adjustable and the control firmware of the micro-controller inside the portable illumination device is upgradable. In addition, the curved handle's center position may have a foldable hook for hanging the device downward so that it may be used as a lantern or flash light.

19 Claims, 21 Drawing Sheets

PORTABLE ILLUMINATION DEVICE

BACKGROUND

Being an efficient light source, light-emitting diodes (LEDs) are widely used in illuminating devices, especially portable illumination devices.

SUMMARY

The embodiments of the present disclosure generally relate to portable illumination technologies and relate, but are not limited, to hand and arm carriable illumination devices that may also be self-standing on the ground, a table, or any flat leveled surface.

In accordance with one embodiment of the disclosure, a portable illumination device is provided including a first component having a light source and a second component coupled to the first component, the second component including a curved handle containing one or more battery cells within the curved handle, wherein the light source is powered via the one or more battery cells, and wherein a center of mass of the illumination device is located in the middle point of the curved handle on where the hand is holding the handle. Thus, the hand holding the device does not get tired even after holding the device for a long time. In addition, the curved handle's surface may be texturized to reduce slippage between the handle and the hand holding the handle. In accordance with an aspect of the embodiment, the first component may be a light head of the portable illumination device. In accordance with one aspect of the embodiment, the curved handle includes a C shape and may have a tubular shape. In accordance with another aspect of the embodiment, the curved handle may also include a hook and/or a plurality of feet to stabilize the portable illumination device when it is not being held. The hook may be located at the middle point of the C-shaped handle. In this way, the illumination device may be easily hung for example on a rope, a tree branch, a nail, another hook, or a ring, on a wall, etc., while the illumination device is in use, storage, or being charged.

In accordance with another aspect the embodiment, the portable illumination device may also include a control switch on the curved handle that electrically couples the light source to the one or more battery cells are rechargeable and may be wirelessly rechargeable. By way of example, the control switch is located at the top front place of the C-shaped handle. Thus, when using one hand to hold the handle, the user can use the thumb of the same hand holding the handle to press the control switch button conveniently. In this way, another hand is not required in order to press the button. This one hand holding and controlling the device makes using the device convenient to use.

In accordance with another aspect of the embodiment, the first component may be rotatable relative to the second component and the first component may have member(s) extending therefrom aiding rotation of the first component relative to the second component. In this way, the first component (e.g., light head) can be rotated freely, thus, the illumination device can be used to point the beam at different directions easily and conveniently.

In accordance with yet another aspect of embodiment, the first component may include a reflector for reflecting light from the light source and may have vent(s) to vent heat away from at least one of the light source and the reflector. By way of example, the vent(s) may be shaped vents, such as an array of shaped vents. These shaped vents may be shaped in an arc, an oval, or in the form of fish scales. The vents (e.g., shaped vents) allow air to come in to a housing of the first component (e.g., light head) to cool down the reflector while blocking rain water from coming in. The reflector can also serve as the heat sink for the light source (e.g., LED), which gets hot when it is turned on.

In accordance with yet another aspect of the embodiment, the portable illumination device may include an output device indicating a status of the portable illumination device.

In accordance with another embodiment of the disclosure, a portable charger for a lamp head of an illumination device is provided, wherein the portable charger includes a curved handle that is removably couplable to a light head including a light source, wherein the curved handle includes one or more rechargeable battery cells within the curved handle, wherein the light source is powered via the one or more rechargeable battery cells, and wherein a center of mass of the illumination device is located in the curved handle when the curved handle is coupled to the light head. In accordance with one aspect of the another embodiment, the curved handle includes a C-shaped tubular portion containing the one or more rechargeable battery cells.

In accordance with another aspect of the another embodiment, the curved handle includes a battery controller for controlling the charging of the one or more rechargeable battery cells.

In accordance with another aspect of the another embodiment, the curved handle has one or more indicators disposed on one end of the curved handle indicating a status of the portable charger.

In accordance with another aspect of the another embodiment, the curved handle includes a plurality of feet so that the curved handle is free-standing when not being held.

In accordance with another aspect of the another embodiment, the curved handle has one or more quick-connect latches for coupling the curved handle to the light head.

In accordance with yet another embodiment of the disclosure, a light head of an illumination device is provided, wherein the light head includes a housing having a light source and a reflector that reflects light from the light source. In addition, the housing has an adapter for coupling the light head to a portable charger via one or more quick-connect latches. The portable charger includes a curved handle that is removably couplable to the housing, wherein the curved handle includes one or more battery cells within the curved handle, wherein the light source is powered via the one or more battery cells, and wherein a center of mass of the illumination device is located in the curved handle when the light head is coupled to the curved handle of the portable charger.

In accordance with the aspects of the above-described embodiments, each may have or support a first component (e.g., light head) with multiple light sources (e.g., illumination components such as LEDs), which may each emit light from a front and/or side of the housing of the first component (e.g., light head). For some applications, such as the railway industry, light beams must also be able to shine from the side of the first component (e.g., light head).

In accordance with the above-described embodiments, the portable illumination device, portable charger, and/or light head may be provided with an output device, such as a digital display showing the battery current, percentage of the charge remaining in the battery, the runtime remaining when using the illumination device, or the charge time remaining when charging the battery.

In accordance with the above-described embodiments, an output device, such a buzzer device, which emits audio signals to indicate operating or warning signals to the user. The buzzer can also be used as an alarm.

In accordance with the above-described embodiments, a charging port may be provided on a housing of the first component (e.g., light head) or second component for charging the battery cells and updating the firmware embedded in the controller circuit of the first component or second component.

In accordance with certain embodiments, the first component (e.g., light head) does not have the battery cells contained therein. Thus, the first component can accommodate larger sized reflectors. The larger the size of the reflector, the higher its efficiency for reflecting light(s) towards the front of the light head, which enables the reflector to form beam(s) with increased amount(s) of light lumens and with a more uniformly distributed brightness. This is in contrast to using a smaller reflector which reflects a relatively reduced amount of light lumens with a comparatively reduced uniform distribution of beam brightness. Thus, with larger reflectors more light will be reflected and not wasted relative to smaller reflectors. To further improve side light path efficiency, the reflector may be provided with a reflective back surface to collect and reflect the light beams of the side beam light sources (e.g., LEDs) that reflect sideways. This feature increases the final output side beam brightness by over double that of conventionally designed illumination devices which do not rely on the reflector back side to collect and reflect the light beams of the side beam light sources.

In accordance with the above-mentioned embodiments, a printed circuit board may be disposed within the housing of the first component (e.g., light head) and/or second component (e.g., the curved handle thereof). To the extent that it is disposed in the housing of the first component (e.g., light head), one side of the printed board's surface may be exposed to ambient air through the vent(s), giving it a good heat sinking effect which allows the heat generating components on the circuit board to operate at a low temperature resulting in a higher working efficiency and longer lifetime. In addition, the good heat sinking effects will enable a DC-DC converter for charging the battery to charge the battery with higher current thus shortening the charging time required to fully charge the battery cells. Another advantage of the good heat sinking effect is that it allows another DC-DC converter on the same PCB for driving the light source(s) (e.g., LEDs) to output higher current, thus, increasing the brightness of the light beams.

There are 2 DC-DC converters in the electronic circuits of the illumination device. The first DC-DC converter converts the power supply voltage, usually between 4.75 to 5.25V, even up to 20V from some power supplies, to a voltage that can charge the battery cell bank with appropriate current, to minimize the charging time while not over heating the battery cells so as to prolong the battery's life time. The 2nd DC-DC converter is for driving the light sources, the Main Beam light source (e.g., LED), and the Auxiliary Beam light source(s) (e.g., LEDs). There is a micro-controller for controlling the 2 DC-DC converters to provide current with the input charging current to the battery and the output driving currents for the Main Beam light source (e.g., LED) and the Auxiliary Beam light source(s) (e.g., LEDs), the 4 indicators (e.g., LEDs), the digital display (which may be an LED or OLED display). The micro-controller receives command signals from the push button control switch.

There is firmware embedded in the micro-controller. It detects the signal from the push button control switch, and may vary the mode of the illumination device based on the duration and/or number of presses by a user of the illumination device. Upon detecting a long pressed signal, ≥5 seconds for example, the micro-controller toggles between activating and deactivating the SOS signals on the audible buzzer device and the light source LEDs. Upon detecting a normal length pressed signal, between 1 to 2 seconds for example, the micro-controller can set the illumination of light sources (e.g., LEDs) in accordance with one of 4 modes: Main Beam only, Main Beam+Side Beam, Side Beam only, and Off. Upon detecting a short pressed signal, ≤0.5 second for example, the micro-controller rotates the display of 3 status parameters on the digital display in accordance with one of three different parameter modes: Percentage, Time in hours, and Current in Ampere. Upon detecting 2 consecutive short pressed signals, the micro-controller toggles between Brightness Adjustment mode and normal operation mode. Upon detecting 3 consecutive short pressed signals, the micro-controller toggles between Firmware Updating mode and normal operation mode.

Under the Brightness Adjustment mode, a long pressed signal from the control switch toggles a Brightness Adjustment Direction (BAD) variable, whereas a short or normally clicks signal will increase or decrease the brightness of the LEDs according to the Brightness Adjustment Direction variable. While in the Brightness Adjustment mode, two consecutive short pressed clicks will let the micro-controller exit the Brightness Adjustment mode and go back to the normal operation mode.

Upon detecting three consecutive short pressed clicks, the micro-controller enters the Firmware Update mode. Another such three consecutive short pressed clicks will let the micro-controller exit the Firmware Update mode. Upon finishing the firmware updating, the micro-controller will also exit the Firmware Update mode.

Under Firmware Update mode, the illumination device will flash the Charge Port indicator, which can be one second on and one second off, for example, while waiting for a flash drive to be plugged into the charge port (e.g., a USB-C charge port). Upon detecting that a flash drive has been plugged in for >1 second, the micro-controller will read and extract the content from the flash drive and update its firmware. While doing the updating, the micro-controller will flash a signal by the Charge Port indicator, which can be turned on for 3 seconds and off for 1 second for example, and this sequence may be repeated a number of times till the updating is finished. This light flashing sequence will let the user know that a new firmware is being written into the micro-controller. After finishing the updating successfully, the micro-controller will flash a finishing signal via the Charge Port indicator, which can be turned on (for 0.5 second for example) and off (for 0.5 second for example) in a sequence that may be repeated a number of times (e.g., 4 times) and then the Firmware Update mode can be exited.

The handle can have a foldable hook at its center position which can be used to hang the illumination device downward and use it as a lantern or flash light.

In another aspect, a portable illumination device is provided, including: a first component having a light source and a second component coupled to the first component, the second component including a curved handle containing one or more battery cells within the curved handle, the light source is powered via the one or more battery cells, and wherein a center of mass of the illumination device is located in the curved handle.

In some embodiments, the curved handle includes a C-shaped portion.

In some embodiments, the curved handle includes a tubular shape.

In some embodiments, the portable illumination further includes a control switch on the curved handle, the control switch electrically coupling the light source to the one or more battery cells.

In some embodiments, the one or more battery cells are rechargeable.

In some embodiments, the one or more battery cells are wirelessly rechargeable.

In some embodiments, the first component is rotatable relative to the second component.

In some embodiments, the first component has at least one member extending therefrom aiding rotation of the first component relative to the second component.

In some embodiments, the first component includes a reflector for reflecting light from the light source.

In some embodiments, the first component includes at least one vent to vent heat away from at least one of the light source and the reflector.

In some embodiments, the curved handle includes a hook.

In some embodiments, the curved handle further includes a plurality of feet to stabilize the portable illumination device when it is not being held.

In some embodiments, the portable illumination device of claim 1, further including an output device indicating a status of the portable illumination device In another aspect, a portable charger for a lamp head of an illumination device is provided, wherein the portable charger includes: a curved handle that is removably couplable to a light head including a light source, wherein the curved handle includes one or more rechargeable battery cells within the curved handle, wherein the light source is powered via the one or more rechargeable battery cells, and wherein a center of mass of the illumination device is located in the curved handle when the curved handle is coupled to the light head.

In some embodiments, the curved handle includes a C-shaped tubular portion containing the one or more rechargeable battery cells.

In some embodiments, the curved handle includes a battery controller for controlling the charging of the one or more rechargeable battery cells.

In some embodiments, the curved handle has one or more indicators disposed on one end of the curved handle indicating a status of the portable charger.

In some embodiments, the curved handle includes a plurality of feet so that the curved handle is free-standing when not being held.

In some embodiments, the curved handle has one or more quick-connect latches for coupling the curved handle to the light head.

In another aspect, a light head of an illumination device is provided, wherein the light head includes a housing having a light source and a reflector that reflects light from the light source, the housing having an adapter for coupling the light head to a portable charger via one or more quick-connect latches, wherein the portable charger includes: a curved handle that is removably couplable to the housing, wherein the curved handle includes one or more battery cells within the curved handle, wherein the light source is powered via the one or more battery cells, and wherein a center of mass of the illumination device is located in the curved handle when the light head is coupled to the curved handle of the portable charger.

In some embodiments, the brightnesses of the light source can be adjustable.

In some embodiments, the portable illumination device further includes a micro-controller for controlling operation of the illumination device, wherein the micro-controller includes firmware that is upgradable.

In some embodiments, the curved handle's center position has a foldable hook for hanging the illumination device downward so that the illumination device may be used as one of a lantern or flashlight.

BRIEF DESCRIPTION OF THE DRAWINGS

The accompanying drawings, which are incorporated in and constitute a part of this specification, illustrate embodiments consistent with the disclosure and, together with the specification, serve to explain the principles of the disclosure.

DETAILED DESCRIPTION

Figure 1:
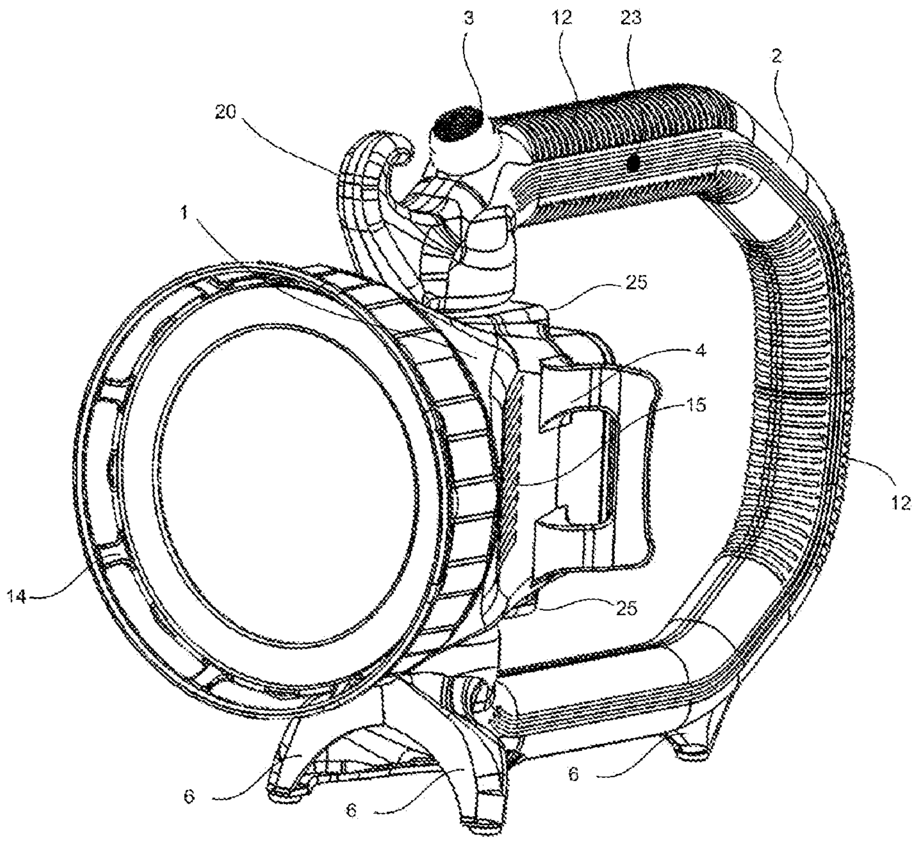
FIG. 1 illustrates a portable illumination device constructed in accordance with some embodiments of the present disclosure.
Figure 2:
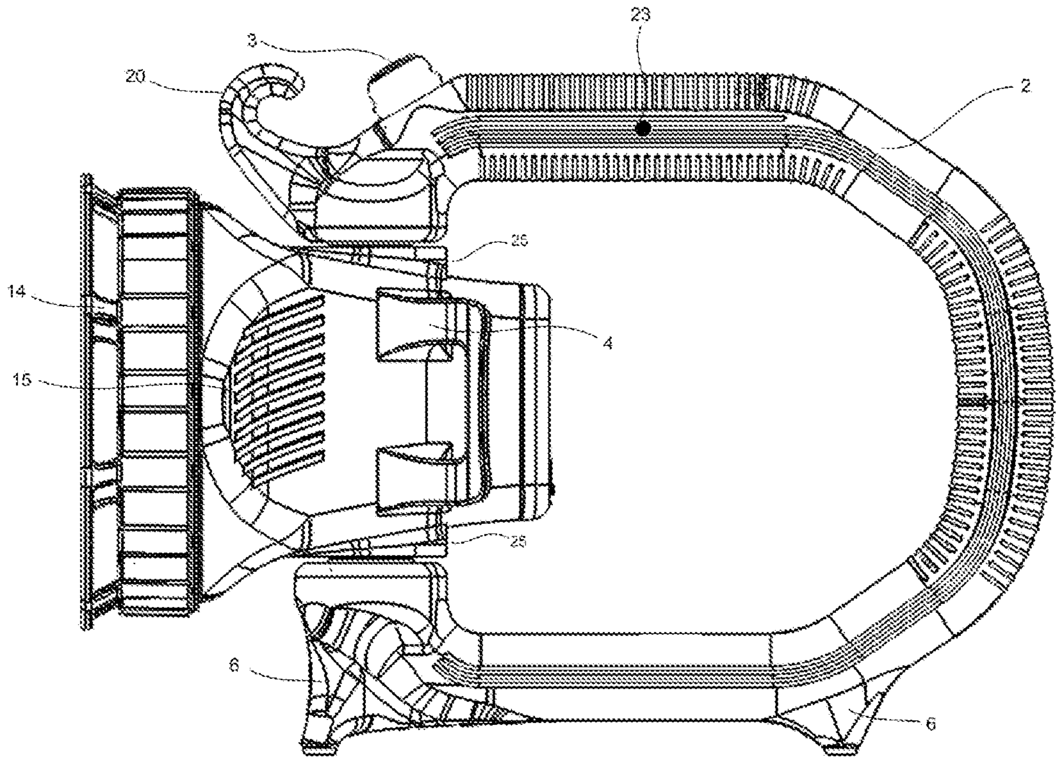
FIG. 2 illustrates a side view of details of the portable illumination device.

Detailed description will now be provided of exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples consistent with aspects related to the disclosure as recited in the appended claims.

In some implementations, illumination devices on the market generally either place the batteries inside a large chamber where the illuminator is located or in a dedicated battery box. In either case, the weight of the battery is concentrated in a small enclosed container, which makes the user of such illumination device feel and carry the full battery weight by holding onto a small point and make it tiresome to carry and hold this style of illumination device for a long period of time. In addition, the existing illumination devices have their control switch placed on the illumination device's light head chamber, which requires two hands to operate the illumination device. In particular, one hand must hold the illumination device, while the other hand activates the control switch (e.g., pushes a button that activates the control switch). An improved illumination device is disclosed herewith which solved these problems.

The present disclosure provides illumination devices including light heads which each include a chamber or housing that contains components of the illumination device except for at least the battery cells and the control switch. In some embodiments, the light head may have all electronic or electrical components except for battery cells and control switch (along with any needed wiring).

Some embodiments of the present disclosure include a C-shaped handle, a push button switch mounted onto a front portion top side of the C-shaped handle, and multiple battery cells placed inside this C-shaped handle. Placing the battery cells evenly inside the handle allows the battery weight to be evenly distributed along the C-shaped handle. The handle shape and the battery cell positions are placed so that the center of mass is located at the center point of the holding area. In this regard, the handle may be curved in a C or D-shape or in some other shape. Alternatively, the handle may be shaped differently with the battery weight being distributed evenly along the handle.

When holding a curved handle shape (e.g., a C or D-shaped handle), since the whole illumination device's weight is evenly distributed, the user's hand will hold the handle portion at or near the equilibrium balance point. Thus, the hand won't feel the illumination device is heavy and tiresome to hold after a short while.

Because the push button switch is located on the front top portion of the handle, it can easily be operated with only the carrying hand, with the control switch then being controlled by a thumb push from the same hand. Optionally, the illumination device can be turned on by sound or voice. In some embodiments, the illumination device can be waterproof to safeguard the electrical components As shown in FIGS. 1-12, an illumination device includes: a light head having a light head chamber or housing (1), C-shaped handle (2), a rubber cap covered push button switch (3), a pair of ear shaped handle on the light head chamber for rotating the head chamber to either left or right way (4), an internal mechanism to have an detent action effect when rotating the light head chamber (5), a pair of foldable or stationary feet for letting the device stand upright along (6), reflector (7), LED light source (8), a few auxiliary LEDs inside the light head chamber (9), a printed circuit board which has all the control and drive circuits and components (10), a battery bank composed of a one to five or even more cells (11), Anti-skid textured surface on the C-shaped handle (12), a gear-shaped wheel with a wave-shaped surface (13), buffer frame (14), air hole(s) or vent(s) (15), a digital display (16), charging port (17), current indicator (18), remaining time indicator (19), the hook at the end of the handle (20), charge indicator (21), buzzer (22), center of mass (23), remaining battery percentage indicator (24), and buffer chamber (25).

Figure 3:
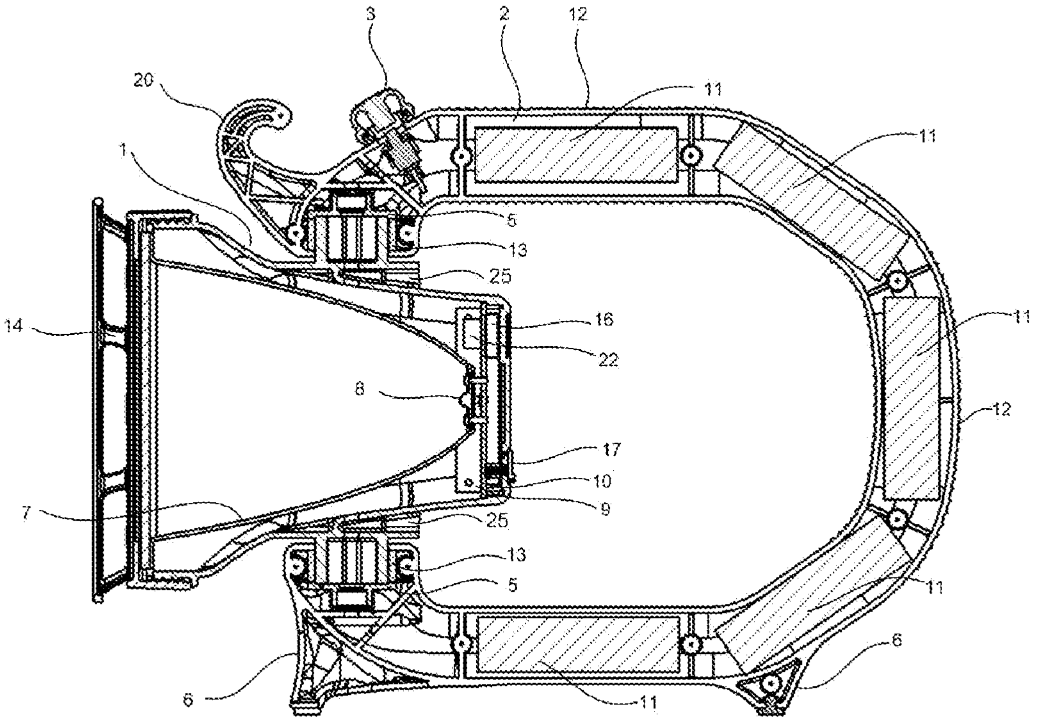
FIG. 3 illustrates an internal view of details of the portable illumination device.

The light head chamber (1) is a significant component of the illumination device. The light head chamber (1) includes reflector (7), the light source (e.g., LED) (8), a few auxiliary light sources (e.g., LEDs) inside the head chamber (9), and the printed circuit board (10) which has the control and drive circuits and components. The battery cells (11), as shown in FIG. 3, are placed inside the C-shaped handle (2). In this embodiment, the light head chamber (1) does not include any battery cells (11) or rubber cap covered push button switch (3).

The advantages of placing the battery cells individually inside the handle (and not the light head) are as follows:

A. It allows the battery cells to have improved heat dissipation since the surface of each cell can dissipate the heat individually to the handle's inside surface which has its other side of the surface having direct thermal contact with the ambient air. This results in good heat dumping to the ambient air so that each battery cell will not have significant temperature rise during operation. In conventional illumination devices, battery cells often bundled together thus they touch one another giving heat to each other, resulting in significant temperature rise of the whole bundle during operation.

B. It distributes the weight of the battery cell evenly along the handle and the user will not feel the weight concentrated in the light head. As such, the light head will not be too heavy while the handle is generally too light, as is generally the case when using conventional illumination devices. The light head will get damaged easily when it is dropped to ground accidently due to the highly concentrated weight on the light head. After placing the battery cells in the handle, the light head is not too heavy, thus it will not be damaged easily when it is dropped to ground accidently.

C. After distributing the weight along the handle, the illumination device will have its weight center located in the middle point (23) of the C-shaped handle, the same point where the user's hand center is located, giving the user a good feel when holding the handle.

Since the light head chamber (1) does not have the battery cells (11), the light head chamber (1) can accommodate large size reflector(s) (7). The larger the size of the reflector(s) (7), the higher the efficiency for collecting light and reflecting it towards the front of the light head chamber (1) to form the beam, as opposed using a smaller reflector and reflecting less lights and having a large amount of light not being reflected and, ultimately, wasted.

In some embodiments, the head chamber (1) has fish scale-shaped air holes or vents (15) to allow ambient air to flow into the light head chamber (1), so as to dissipate heat from the light source (e.g., LED) (8) while preventing raindrops from entering the head chamber.

The Buzzer (22) may be located inside the light head chamber (1), next to the air hole(s) or vent(s) (15). With the buzzer, the illumination device can be used as an alarm for the illumination device.

The LED light source (8), reflector (7) and a few auxiliary LEDs (9) are located inside the light head chamber (1). Light from the light source is collected via the mirror surface inside the reflector (7) to form a circular light spot. The large reflector can improve the quality of the light spot and the evenness of the light, i.e., to obtain a light beam spot with well uniformly distributed brightness. The auxiliary light source inside the head chamber got reflected with high efficiency through the outside surface of the reflector to let the beam be directed to the radial direction to the light head thus the lights can be seen by the user and others who are not in the front axial direction of the illumination device. This feature is especially useful for railway workers.

The C-shaped handle (2) as in FIG. 1, may be sized in such a way that it can either be held by hand or carried by arm or even shoulder. To ensure a firm grip, the handle surface is texturized to improve friction and reduce slippage.

The C-shaped handle (2) is mounted on a pair of shafts which are formed onto a pair of buffer chambers (25), which provide a shock buffer when the whole illumination device falls to ground or hit by some objects and the handle receives too strong a shock, thus, the shafts or the head chamber won't be damaged.

Figure 18:
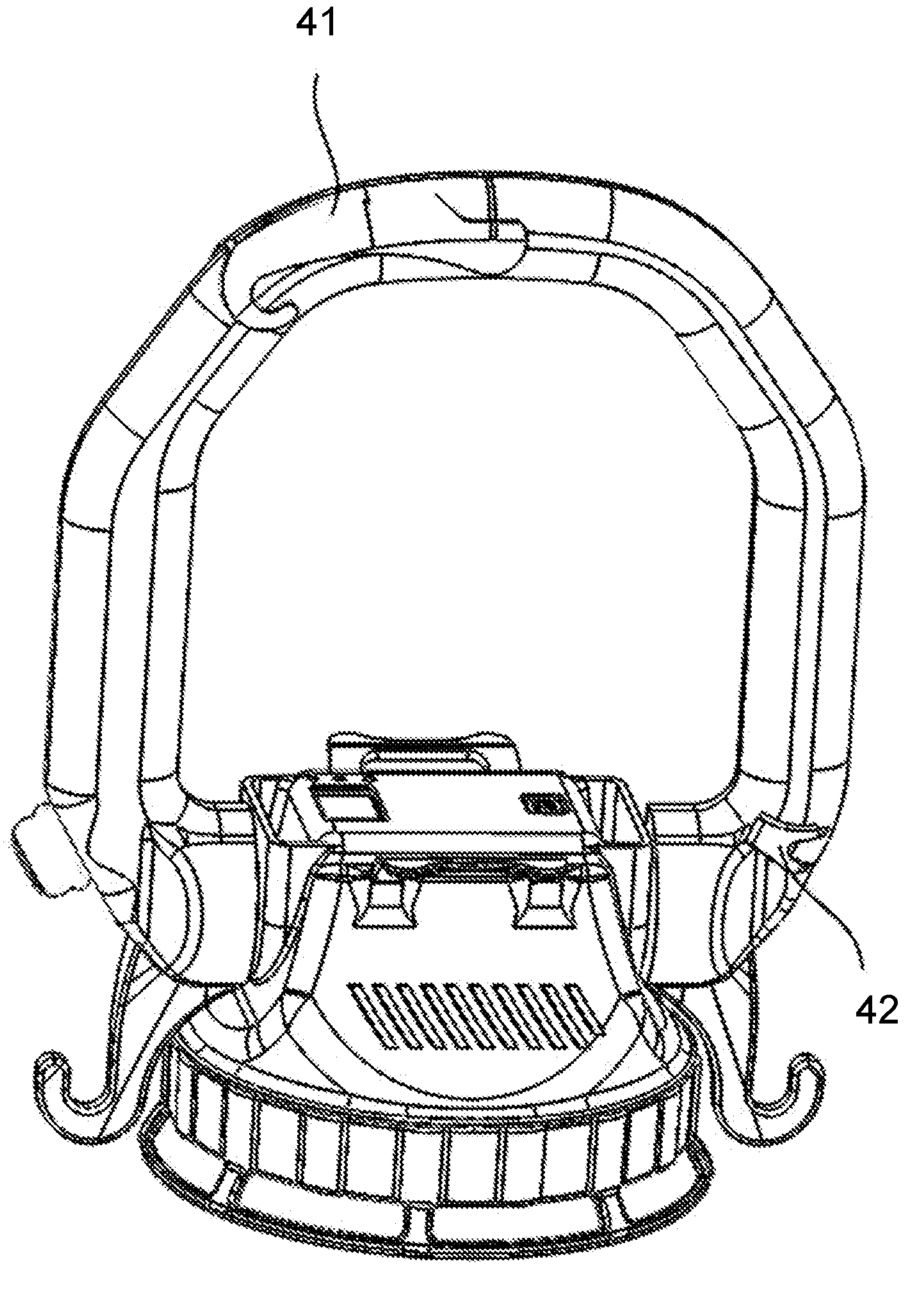
FIG. 18 illustrates a foldable hook located at the center of the handle for hanging the illumination device downward as a lantern or flashlight with the hook at a closed position

In some embodiments, the handle (2) can be removable from the light head, as shown in FIG. 18. In addition, the handle (2) can be a charger which includes a battery controller to control charging and use of battery power, a charging port, and a charge level indicator on the handle. In addition, the handle may be couplable to the light head with a quick release mechanism (such as a latch on a male/female connector). In this way the curved handle charger with batteries can be charged independently from the light head, such that if one set of battery cells is drained in one handle charger, that handle charger may be quickly replaced by another fully charged handle charger. One or more quick release mechanism(s) can be integrated on the above-mentioned shaft outfitted with one or more electrical connectors (e.g., XLR (X Latching Resilient) connector) that can interface with one or more female electrical connectors on the light head which are electrically connected to the light source(s) via wires under the control of electronics on the PCB board. Note that the orientation of the male and female connectors may be reversed.

Some embodiments provide output devices to output visual or audio information regarding the status of the illumination device. By way of example, the output devices may include the digital display (16), indicators (18), (19), (21), and (24) and/or buzzer (22). By way of example, the digital display (16) may show battery current, the percentage of the charge remaining in the battery, the run time remaining when using the device for illumination running at the current setting mode, and the charge time remaining when charging the battery. When showing the time remaining when being used as an illumination device, the current is coming out of the battery, thus, the current value shown has a negative sign. When showing the time remaining for charging the battery, the current comes into the battery, the current is a positive value and it does not have the negative sign; When the device is both being charged and used as an illumination device, the display will show a negative current value if the draining current for driving the light sources is larger than the charging current, or a non-negative value if the charging current is larger than the draining current. When the current shows a negative value, the time shown is the running time of the battery that remains if the current setting mode is active. If the current shown is a non-negative value, the time shown is the charge time needed for charging up the battery cells fully.

Figure 4:
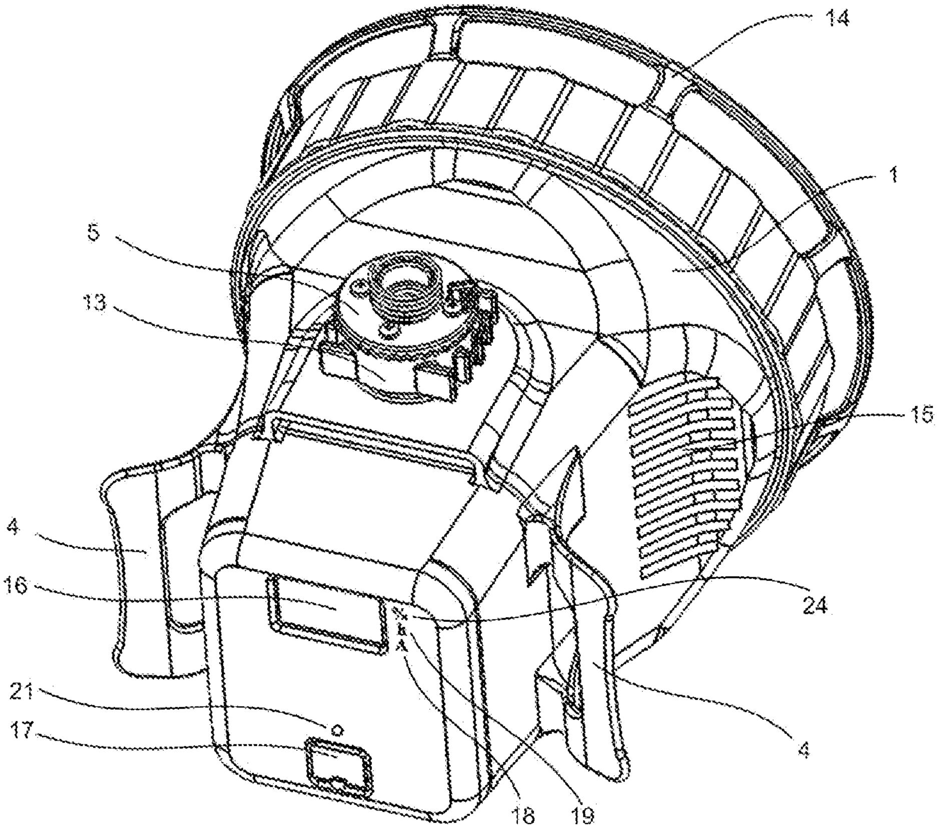
FIG. 4 illustrates a back view of details of the portable illumination device.

As shown in FIG. 4, there are four indicators which were made up by 4 individual LEDs (24), (19), (18) and (21): The top indicator shows "%" sign (24). When this is lit, the digital display (16) shows the percentage of energy left in the battery. Another indicator shows "h" (19) shows the number of hours needed to finish charging the battery when the device is being charged, or the number of hours the battery will last when the device is being used as an illumination device. Another indicator shows "A" (18) which is the charging current to the battery when the device is being charged or the battery discharging current when the device is being used as an illumination device and the current value is shown as a negative value because the current is being drawn out from the battery. When the device is both charged and being used as an illumination device, the charging current and the discharging current can be larger or smaller than each other, the current display value can sometimes be positive while being negative at the other times depending on whether the power supply is being used for charging, what light sources are turned on, and what the brightness level(s) are set to. There is a 4th indicator (21) located near the charging port connector (17), which will be lit up when the device is being connected to a charging power supply through a charging cable and when there is a charging current going into the battery. When the device is charged or used as an illumination device, the display (16) will rotate showing up to four parameters: percentage of the energy left in the battery, the time needed to finish the charge or the remaining run time of the battery, the charging or discharging current on the battery, and the remaining time the battery can run on the existing setting mode. By way of example, regarding the setting mode, when the illumination device is set to the front beam mode and/or side beam mode, the time shown on the display (16) will be the estimated time the battery cells will last by driving the main beam. In addition, in some embodiments, the indicators (24), (19), (18) and (21) can work in an automatically rotating manner (in either direction) to show percentage(s) for a few seconds, then show the charging current (with positive value), discharge current (negative value), or the balance of current when the device is charging while it is also being used to emit light(s). In this regard, if the battery is receiving current from the charging power supply, the current is positive; if the battery is providing current to the drive, the current values is shown as a negative value. The parameter display can be arranged in a fixed mode as well: it shows one of the 3 parameters, percentage, time and current, until the user quickly clicks the control switch button for one time (or other number of times) and the display will show the next parameter. The rotating sequence can be: percentage, time, then current, or other sequences. In addition, the remaining hours for charging during charging mode or for powering the lights during usage mode may be shown. In addition, the charging time required (if the battery is under being charged mode), or the remaining run time may be shown if the battery is in discharged mode.

The hook (20) in FIG. 1, located at the end of the handle (2) top portion, allows the illumination device to be hung onto a rope, a tree branch, a nail, another hook, or ring, on a wall, etc., while the illumination device is in use or storage, or being charged. For railway companies, a long rope can be hung along a wall and dozens of such illumination devices will be hung onto the rope and be charged and stored together without taking up precious surface areas of desks or tables.

Inside the mechanism between the handle and the illumination device head, some embodiments of the present disclosure provide a gear-shaped wheel (13) with a wave-shaped surface which generates detent actions when the handle is rotated on the head. The detent action gives firm positioning of the handle vs. the head and results in steady beam pointing. To protect the wires that connect the components inside the handle and the head from being overly twisted, the handle rotation angle is limited to between −180° and +1800 or even a smaller range.

Figure 9:
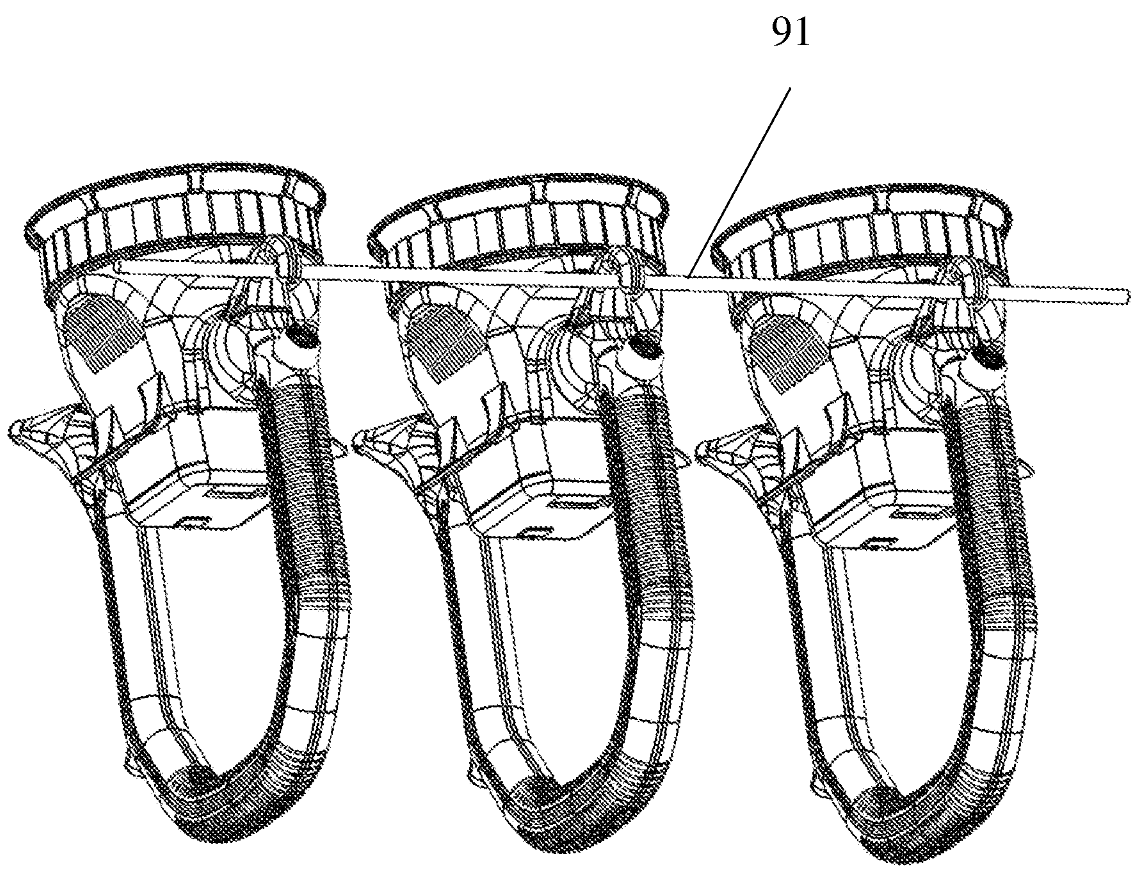
FIG. 9 illustrates a third use scenario of the portable illumination device.
Figure 10:
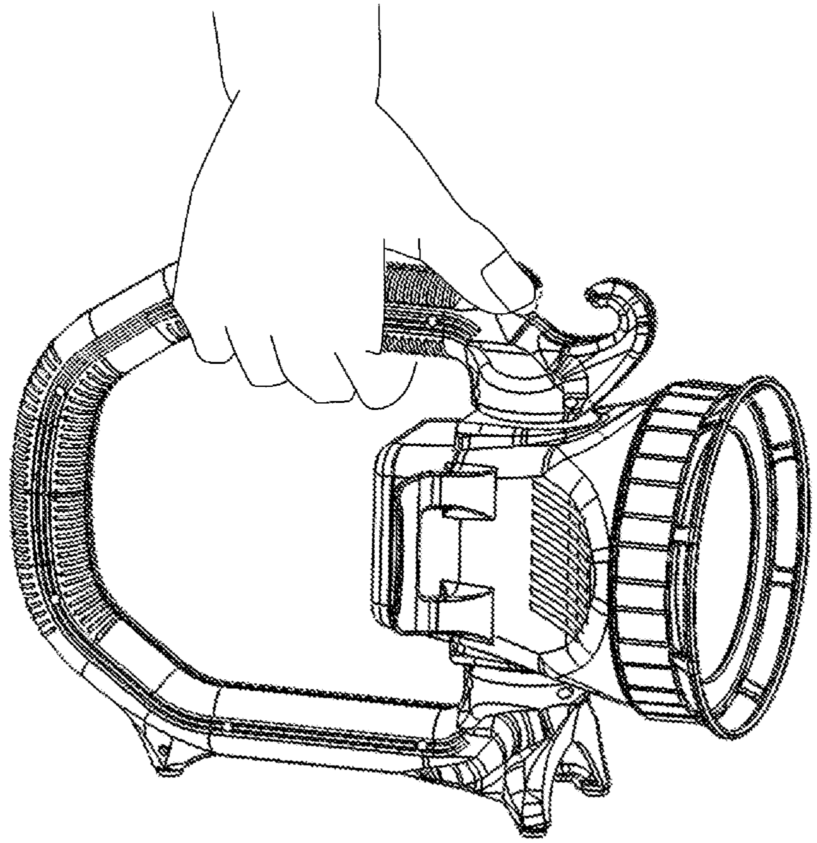
FIG. 10 illustrates a fourth use scenario of the portable illumination device.
Figure 11:
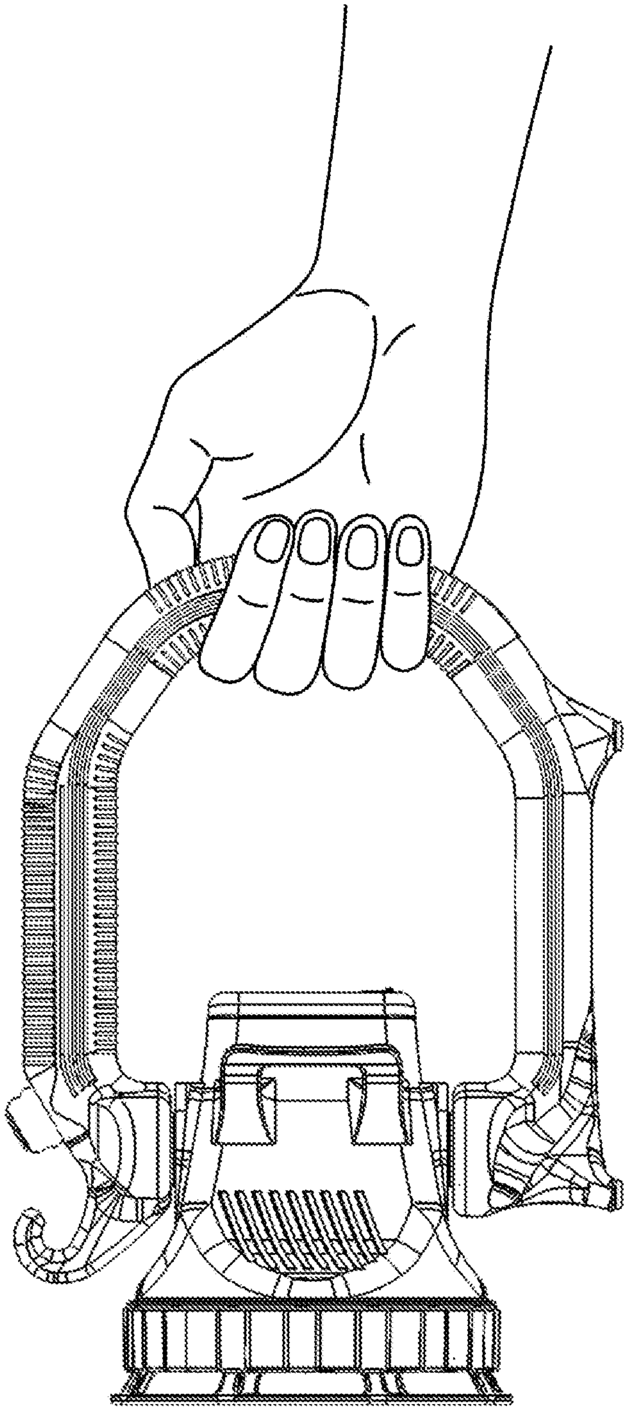
FIG. 11 illustrates a fifth use scenario of the portable illumination device.
Figure 12:
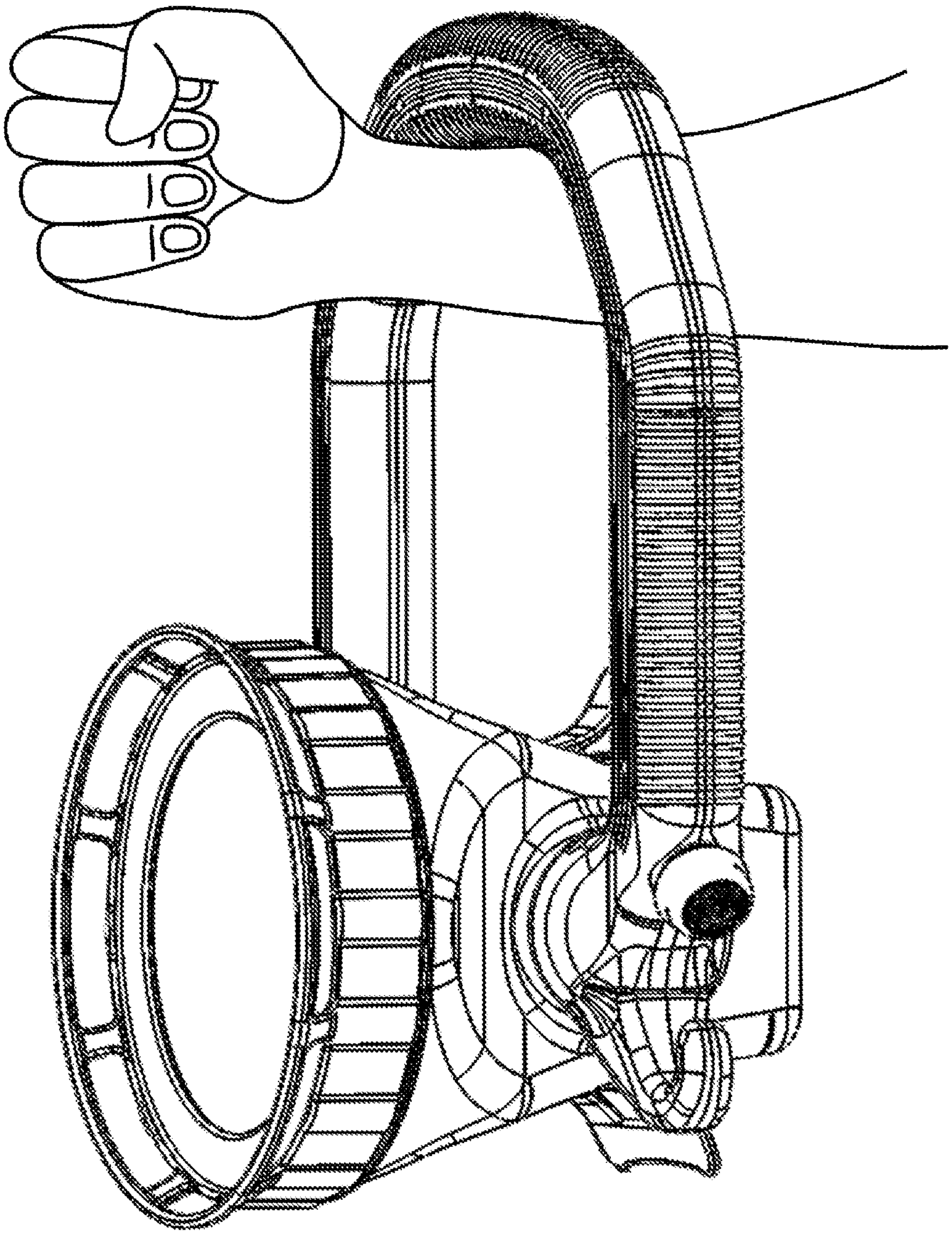
FIG. 12 illustrates a sixth use scenario of the portable illumination device.

In some embodiments, a kit as illustrated in FIG. 9 can be provided, including a wireless charging station (91). Although in the embodiments as illustrated wireless charging station (91) can have a single straight bar shape or be a cable, in some other embodiments wireless charging station (91) can be a plurality of hooks, loops, or handles. Wireless charging station (91) can be electrically coupled to an electrical power source, such as a wall socket.

A plurality of the illumination devices can be hung on the wireless charging station 91 for wireless charging. In some implementations, as illustrated in FIG. 9, the illumination devices are hung on the wireless charging station (91) with hooks (20), and hooks (20) have wireless charging receptor built therein. In some other embodiments, the illumination devices can be hung on the wireless charging station (91) directly through the "C"-shaped handles, which have wireless charging receptor built therein.

Another aspect of the present disclosure provides the placement of the control button (3) onto the handle (2), as opposed to placing the button (3) on the main head of the illumination device as found in conventional illumination devices. This feature allows the users to control the illumination device using the thumb of the holding hand, as opposed to using one hand to hold the handle and another hand to press the button. This single-handed operation gives a much better feel and convenience for using the illumination device. In some embodiments, an SOS signal can be sent to a control center by the control button (3) for emergency, for example, by pressing the control button for multiple times consecutively.

For some applications, such as the railway industry, light beams shining to the side of the light head are needed. To meet this need, the illumination device provides such side beams. To improve the light path efficiency, the illumination device relies on the reflective back surface of the reflector to collect and reflect the light beams of the side beam light sources (e.g., LEDs) towards the sides of the light head. This feature increases the final output side beam brightness by over double that of the conventionally designed illumination devices which do not rely on the reflector back side to collect and reflect the light beams of the side beam LEDs.

Figure 5:
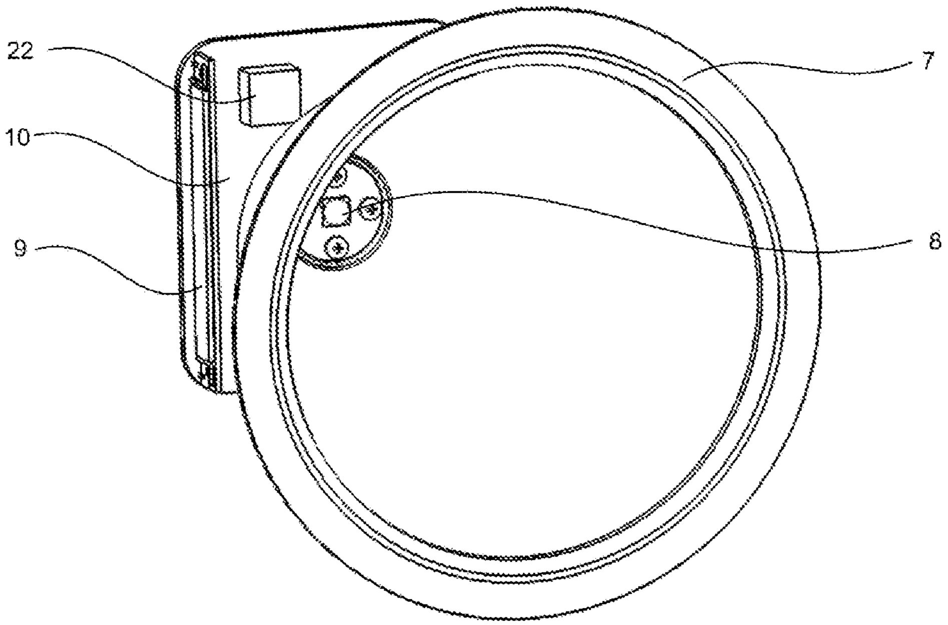
FIG. 5 illustrates a front view of light head details of the portable illumination device.
Figure 6:
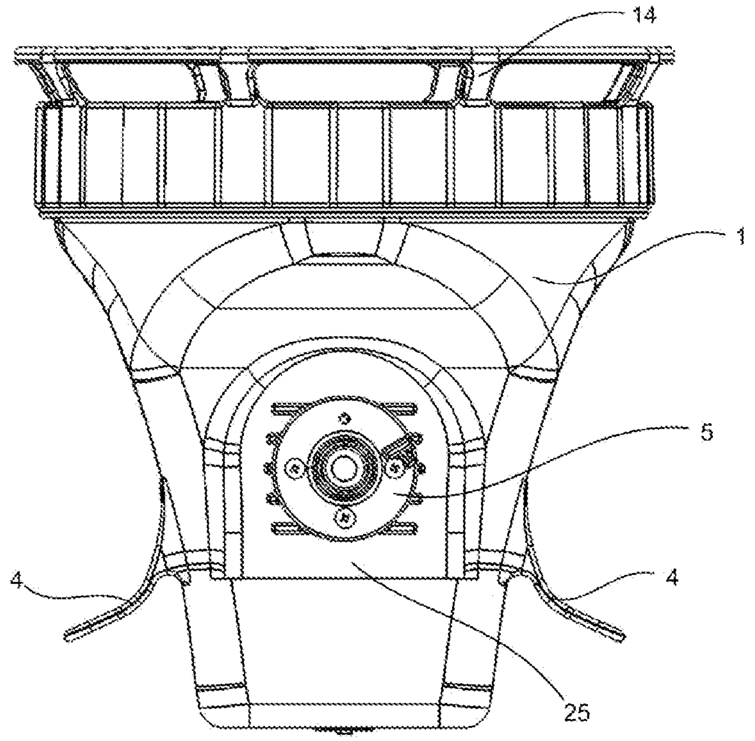
FIG. 6 illustrates a bottom view of light head details of the portable illumination device.
Figure 7:
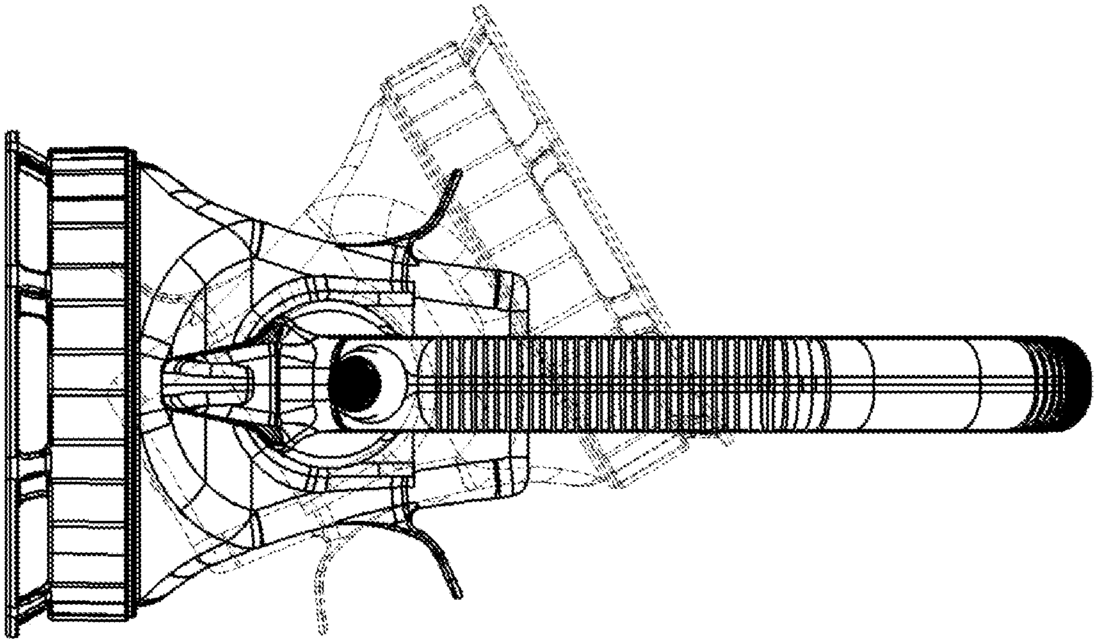
FIG. 7 illustrates a first use scenario of the portable illumination device.
Figure 8:
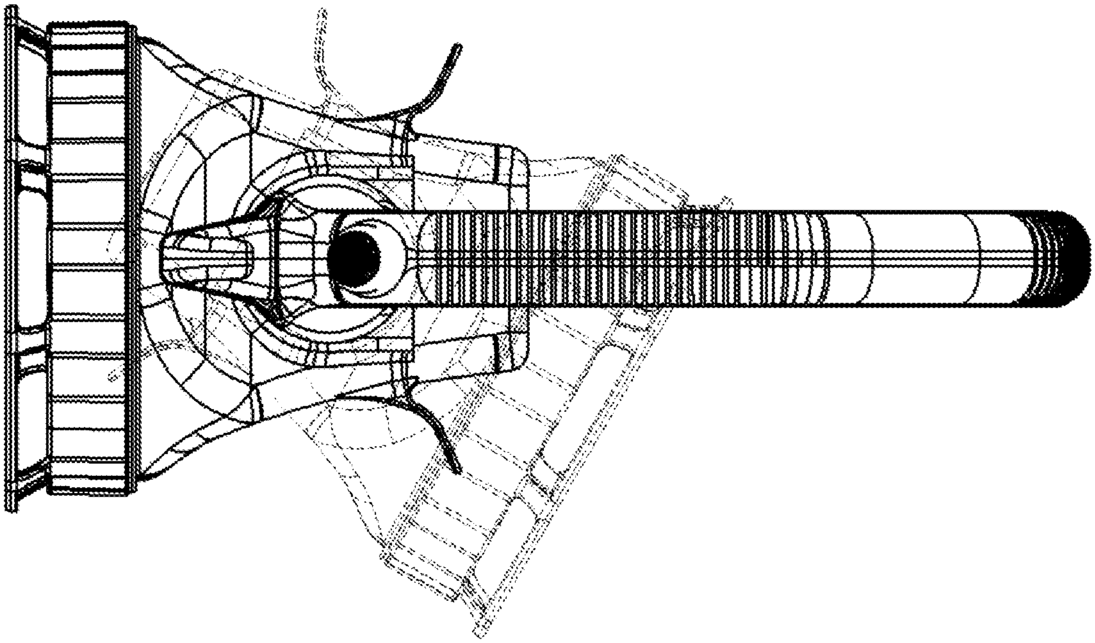
FIG. 8 illustrates a second use scenario of the portable illumination device.

In accordance with another aspect of the present disclosure, the printed circuit board 10, in FIG. 5, is placed inside the main head on a side of the board's surface that is exposed to ambient air, giving it a heat dissipating effect, which allows the heat generating components on the circuit board to operate at a low temperature and thereby have a high working efficiency and long lifetime.

In the control circuit on the printed circuit board, some embodiments of the present disclosure provide a microprocessor with sophisticated firmware embedded therein. The firmware uses multiple measurement parameters to monitor and display the battery's charging and discharging current, and calculate and display the charge time and usage time respectively (in addition to the conventional battery remaining energy display).

In some embodiments of the present disclosure, the illumination device may be referred to as a flashlight, a torch, a lantern, etc.

In accordance with an embodiment, the illuminating device has a rotational light source in the light head chamber head.

In accordance with at least one embodiment, the light head chamber (2) includes fish scale shaped vents on its walls to allow ambient air to ventilate the air inside the chamber housing and to cool down the large metal reflector which serves both as the light beam forming reflector and the heat sink for the light emitting component, LED. The ambient air coming in through the vents will also cool down the bottom side of the PCB having the controller components located on the other side to improve the controller's power efficiency and prolong its lifetime.

In accordance with at least one embodiment, the control switch for the lights is mounted on the top side of the handle, just a little distance in front of the hand-holding place. It can be conveniently pressed by the thumb finger of the holding hand. Thus, the device can be operated by one hand. Optionally, the device can by turned on or off by sound or voice.

In accordance with at least one embodiment, there is a connection port provided for charging the battery cells and updating the firmware embedded inside the controller circuitry. By way of example, the connection port may include a USB C, USB, mini USB, micro USB, or DC jack connector.

In accordance with at least one embodiment, there is a buzzer device, which gives audio signals to provide operating or warning signals to the user. The buzzer can also be used as alarm(s). By way of example, the audio alarms can include SOS signal(s) after pressing the control button for a longer period of time, such as 5 seconds. At the same time, the lights of the digital display (16) and/or indicator(s) (18), (19), (21), and (24) will flash SOS pattern(s).

The bottom portion of the handle has three foldable feet, which allow the device to stand alone upwards.

To ensure a firm grip, the handle surface is texturized to increase friction and reduce slippage.

Figure 17:
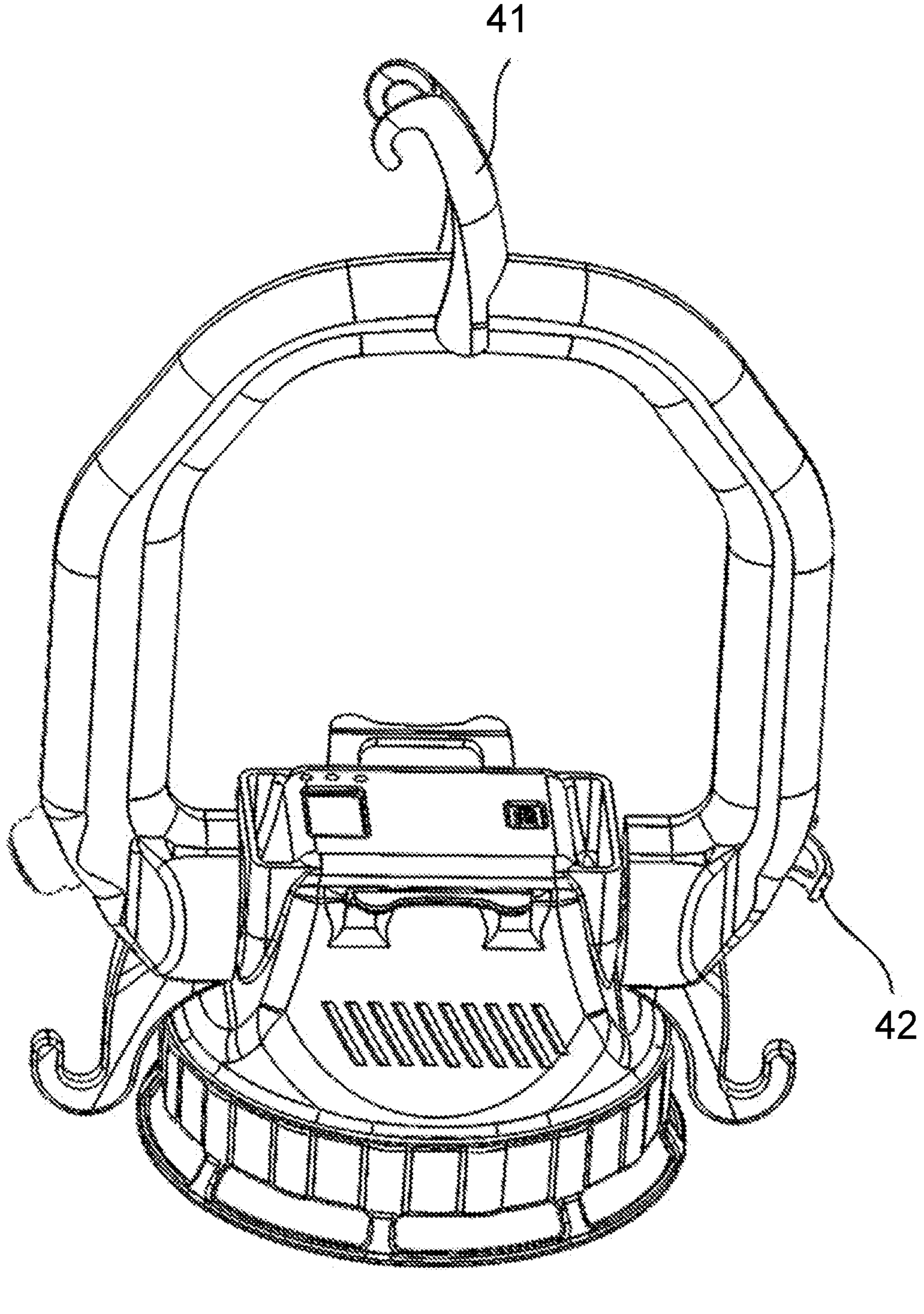
FIG. 17 illustrates a foldable hook located at the center of the handle for hanging the illumination device downward as a lantern or flashlight with the hook at an open position.

In accordance with at least one embodiment, there is a hook (41) located at the middle point of the C-shaped handle, as shown in FIG. 17. It allows the illumination device to be easily hung for example on a rope, a tree branch, a nail, another hook, or ring, on a wall, etc., while the illumination device is in use, storage, or being charged. By way of example, the hook (41) may be a foldable hook, shown in FIG. 17 it is at its open position and in FIG. 18 it is at its closed position. on the hook is at the center position of the handle, it allows hanging the illumination device downward thus it can be used like a lantern.

Figure 13:
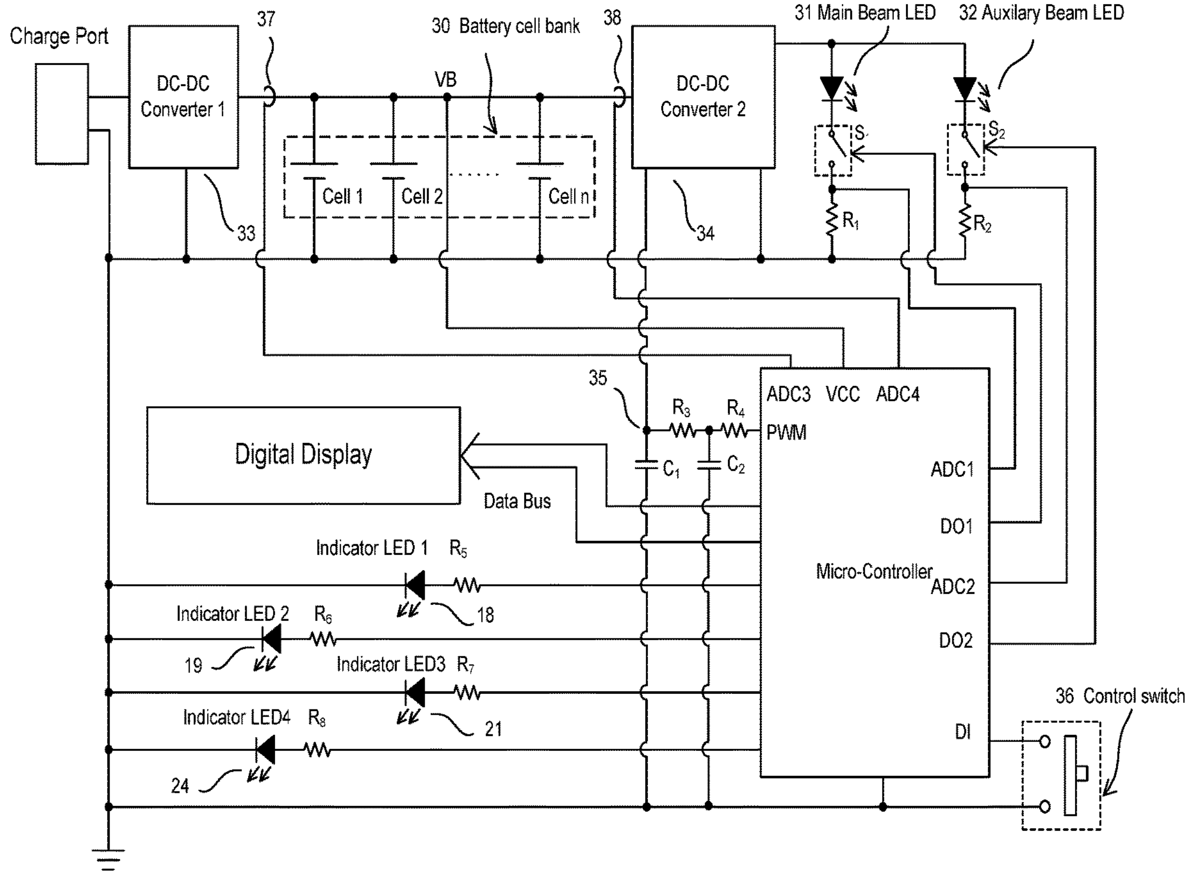
FIG. 13 illustrates the block diagram of the battery charging, light source driving, and their control circuits.
Figure 14:
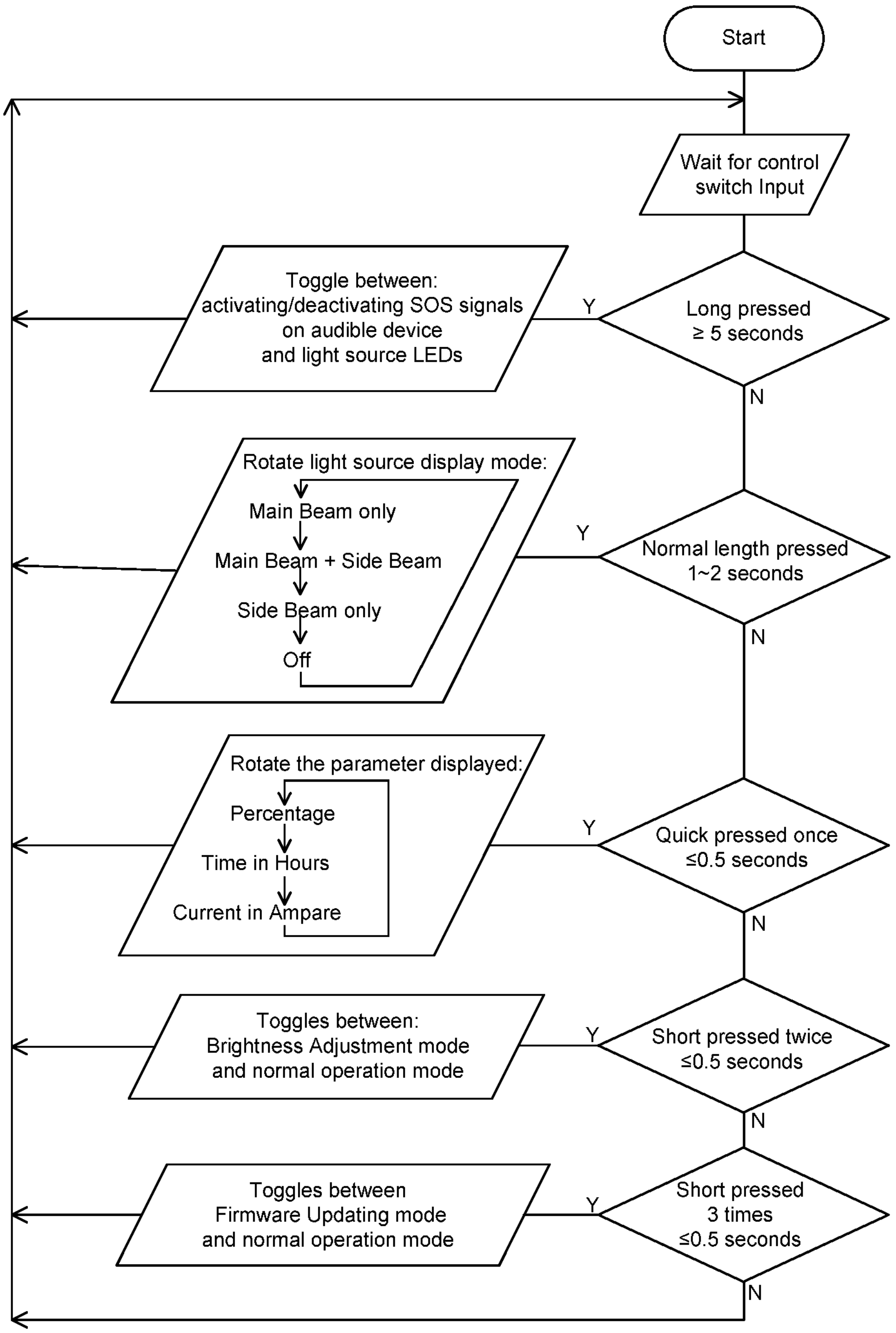
FIG. 14 illustrates the flow chart of the firmware embedded in the illumination device.
Figure 15:
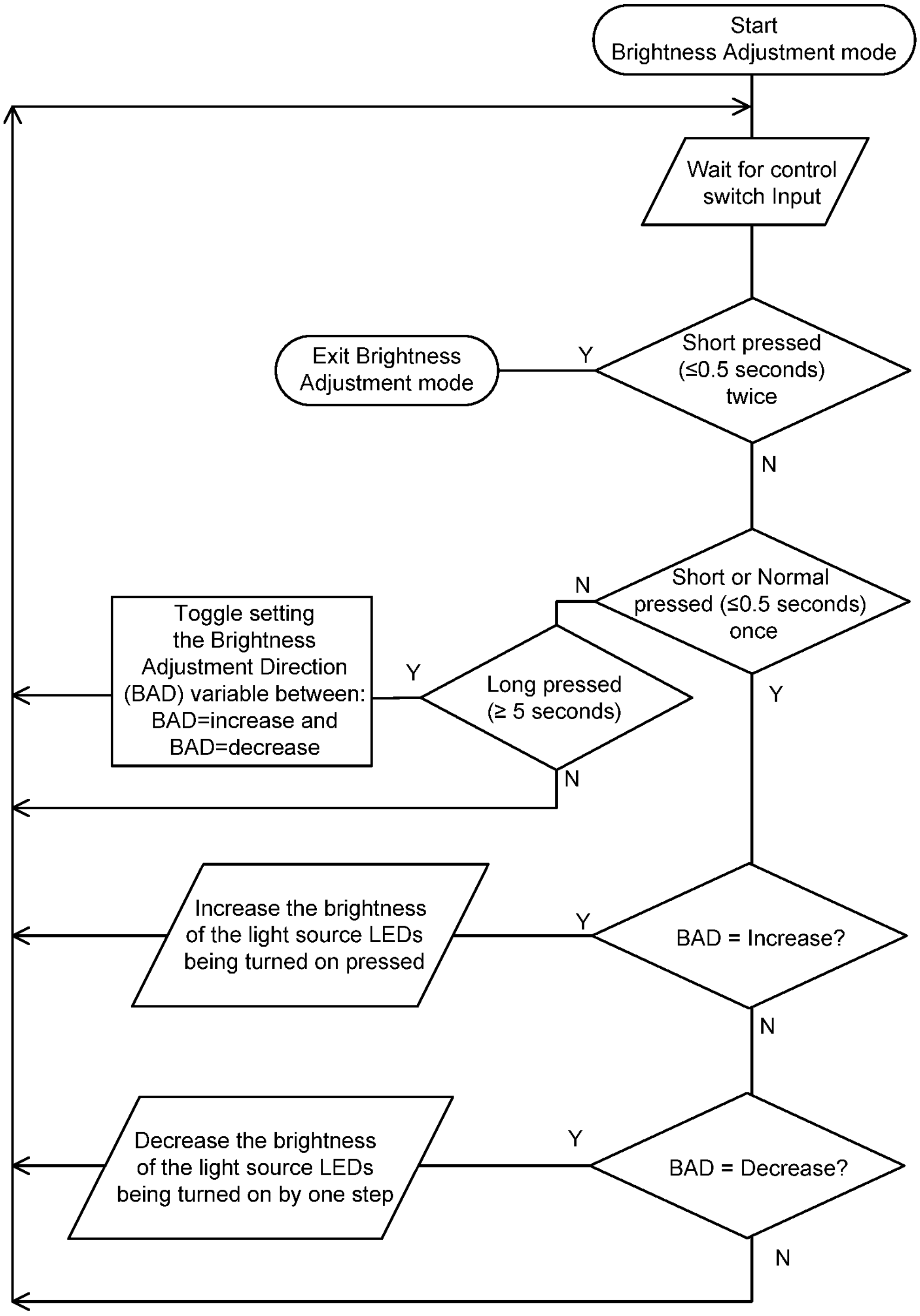
FIG. 15 illustrates the flow chart of the Brightness Adjustment subroutine in the firmware.
Figure 16:
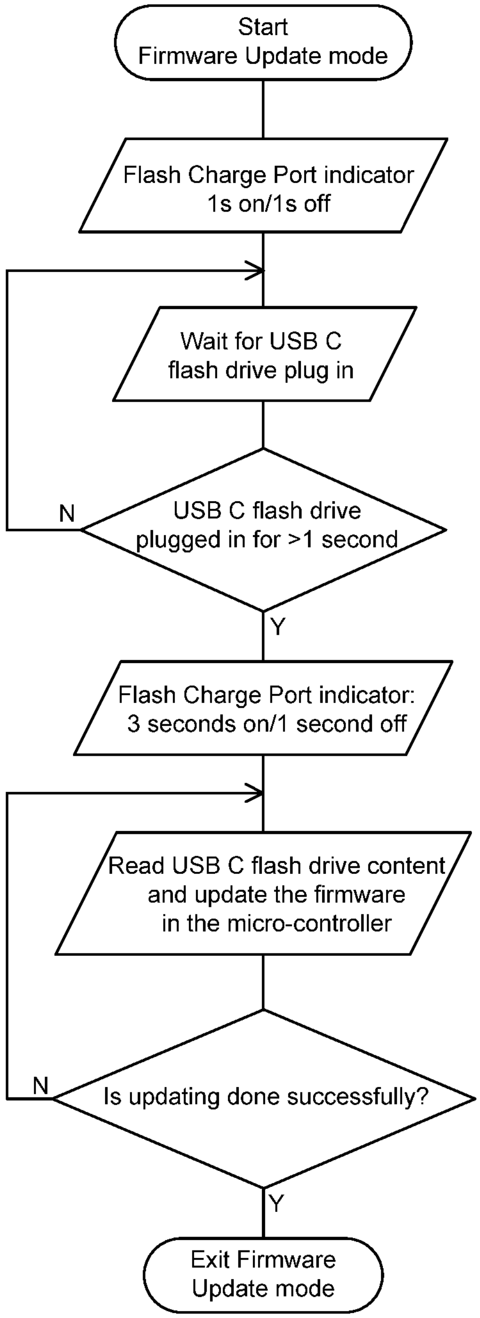
FIG. 16 illustrates the flow chart of the Firmware Update subroutine in the firmware.

The electronic circuit block diagram for the electronics of the illumination device is shown in FIG. 13. As shown in FIG. 13, there are 2 DC-DC converters, 33 and 34 in the figure, one is for charging the battery cell bank (30), the other is for changing battery's constant voltage into controllable constant currents for driving the light sources (e.g., LEDs) 31 and 32. The current sensors 37 and 38 are for sensing the charging and discharge currents of the battery bank respectively. The PWM (Pulse Width Modulation) signal and the low pass filter, C1, C1, R3 and R4 generates a controllable DC signal for setting the output voltage of the 2nd DC-DC converter (34). The final output currents for each of the LEDs is set by S1 and S2 respectively. The two signals can be of constant on and off type, and/or of PWM type to reduce and regulate the average output currents send to the light source LEDs. Except for the battery cell bank 30 and control switch 36 shown in FIG. 13, the remaining electronic components can be located on the light head or curved handle.

FIG. 17 and FIG. 18 show the handle's central position has a foldable hook (41) which is at its open position and close position respectively.

Figure 19:
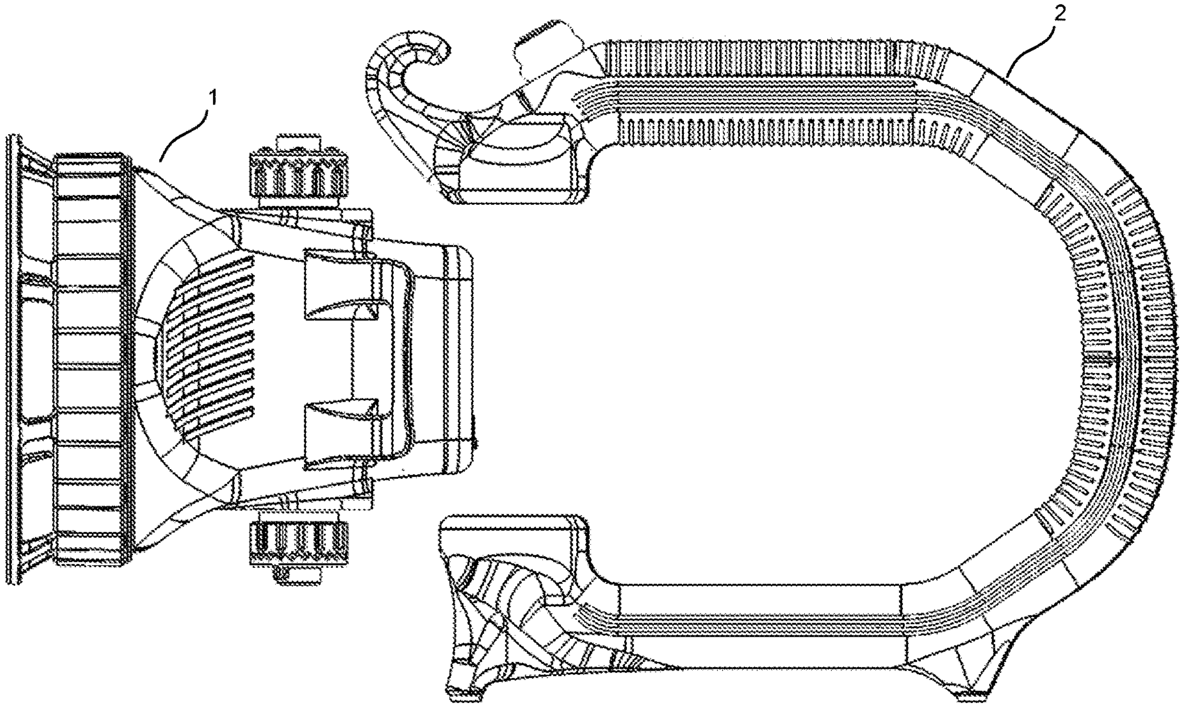
FIG. 19 illustrates a detachable handle being separated from the head chamber.

FIG. 19 shows a detachable handle being separated from the head chamber. This feature allows quick refueling the illuminating device with a pre fully charged battery bank of another handle, as opposed to wait for hours to recharge battery bank in the handle fixed with the device. It is also useful to reduce the total size of the illumination for easier shipping and storage.

Figure 20:
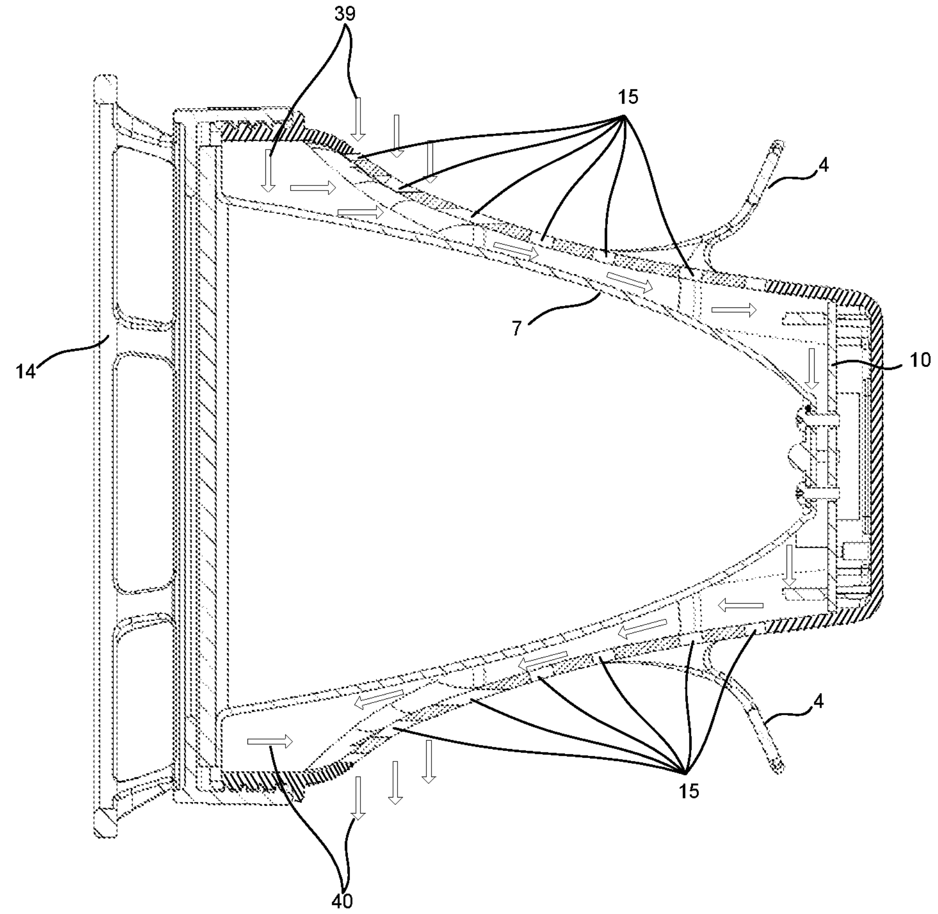
FIG. 20 illustrates a section view of the head chamber where the vents and the air flows are illustrated as cooling down the reflector and the PCB.

FIG. 20 shows a section view of the light head chamber where the vents (10) allow for ambient cool fresh air flow (40) to pass into the light chamber to cool down the reflector and the PCB.

Figure 21:
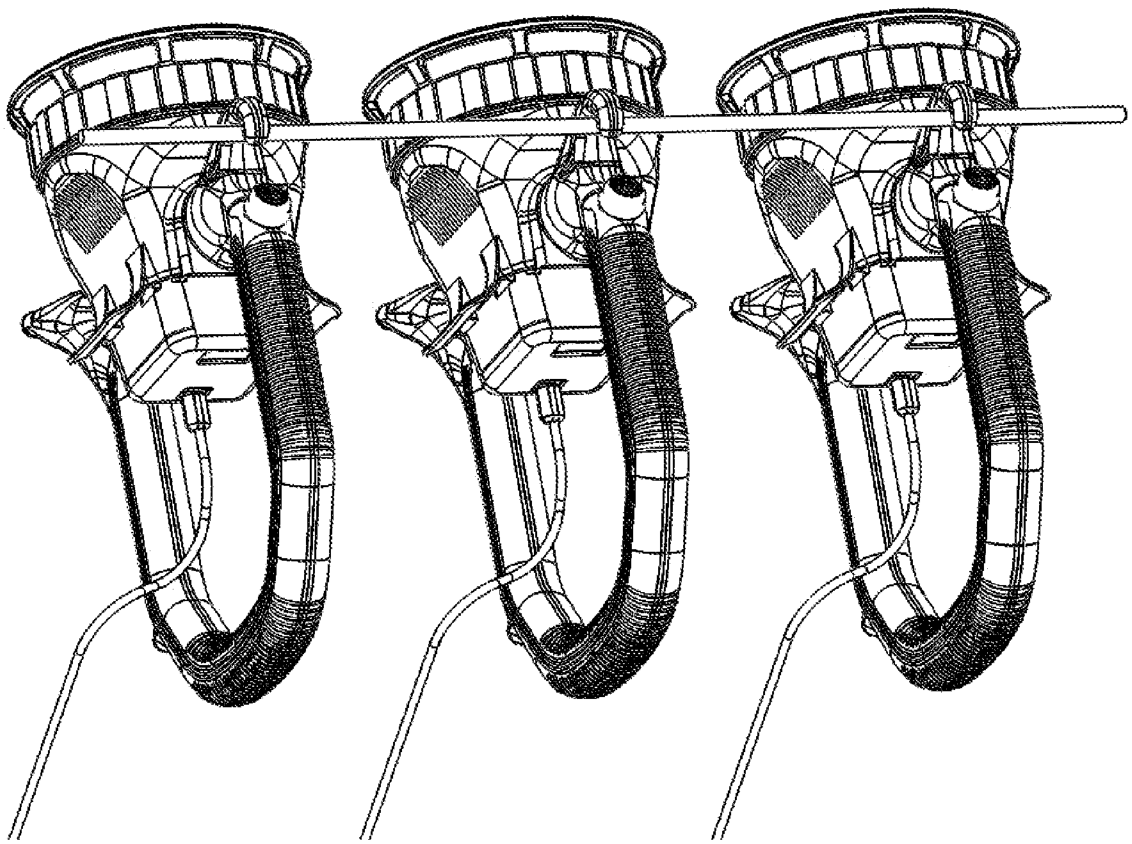
FIG. 21 illustrates a plurality of the illumination devices being hung on a wireless charging station being charged simultaneously.

FIG. 21 shows a gang of illumination devices being hung and charged simultaneously, each by its own charger. This feature saves table surface space and allows the illumination devices be charged and/or stored in a well organized way.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counterclockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software/firmware product or packaged into multiple software/firmware products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

What is claimed is:

1. A portable illumination device comprising:

a first component having a light source; and a second component coupled to the first component through a gear-shaped wheel with a wave-shaped surface that generates detent actions when the second component is rotated relative to the first component, the detent actions providing positioning of the first component relative to the second component for light beam pointing, the second component comprising a curved handle containing one or more battery cells within the curved handle, wherein the light source is powered via the one or more battery cells, wherein a center of mass of the illumination device is located in the curved handle to thereby facilitate a user's holding the curved handle at the center of mass, and wherein the curved handle comprises a C-shaped portion having an anti-skid textured surface opposing the first component.

2. The portable illumination device of claim 1, wherein the curved handle comprises a pair of buffer chambers for shock buffering.

3. The portable illumination device of claim 1, wherein the curved handle comprises a tubular shape.

4. The portable illumination device of claim 1, further comprising a control switch on the curved handle, the control switch electrically coupling the light source to the one or more battery cells.

5. The portable illumination device of claim 1, wherein the one or more battery cells are rechargeable.

6. The portable illumination device of claim 5, wherein the one or more battery cells are wirelessly rechargeable.

7. A kit comprising the portable illumination device of claim 6, further comprising a wireless charging station configured to:

have the portable illumination device hung thereon with the curved handle or a hook; and wirelessly charge the portable illumination device through the curved handle or the hook.

8. The portable illumination device of claim 1, wherein the first component is rotatable relative to the second component in a range between −180° and +180°.

9. The portable illumination device of claim 1, wherein the first component comprises a reflector for reflecting light from the light source.

10. The portable illumination device of claim 9, wherein the first component comprises at least one vent to vent heat away from at least one of the light source and the reflector.

11. The portable illumination device of claim 1, wherein the curved handle comprises a hook.

12. The portable illumination device of claim 1, wherein the curved handle further comprises a plurality of feet to stabilize the portable illumination device when it is not being held.

13. The portable illumination device of claim 1, further comprising an output device indicating a status of the portable illumination device.

14. A light apparatus comprising the portable illumination device of claim 1, and a portable charger for a light head of the portable illumination device, wherein the portable charger comprises: the curved handle that is removably couplable to the light head comprising the light source, wherein the curved handle comprises one or more rechargeable battery cells within the curved handle, wherein the light source is powered via the one or more rechargeable battery cells, and wherein the center of mass of the illumination device is located in the curved handle when the curved handle is coupled to the light head.

15. The portable charger of claim 14, wherein the curved handle comprises a battery controller for controlling the charging of the one or more rechargeable battery cells.

16. The portable charger of claim 15, wherein the curved handle has one or more indicators disposed on one end of the curved handle indicating a status of the portable charger.

17. The portable charger of claim 16, wherein the curved handle comprises a plurality of feet so that the curved handle is free-standing when not being held.

18. The portable charger of claim 14, wherein the curved handle has one or more quick-connect latches for coupling the curved handle to the light head.

19. The portable illumination device of claim 1, further comprising a light head, wherein the light head comprises a housing having the light source and a reflector that reflects light from the light source, the housing having an adapter for coupling the light head to a portable charger via one or more quick-connect latches, wherein the portable charger comprises: the curved handle that is removably couplable to the housing, wherein the center of mass of the illumination device is located in the curved handle when the light head is coupled to the curved handle of the portable charger.

* * * * *